May 16, 1961     L. A. RUNTON     2,984,594

CENTER PITCH LINE BELT

Filed Aug. 6, 1957

INVENTOR
LESLIE A. RUNTON

BY

ATTORNEY

United States Patent Office 2,984,594
Patented May 16, 1961

2,984,594

CENTER PITCH LINE BELT

Leslie A. Runton, Middle Haddam, Conn., assignor to The Russell Manufacturing Company, Middletown, Conn., a corporation of Connecticut Filed Aug. 6, 1957, Ser. No. 676,621

1 Claim. (Cl. 154—52.1)

This invention relates to conveyor belts or the like and has for an object to provide a belt of the above type having novel and improved characteristics.

Conveyor belts, which are usually made comparatively thick and stiff in order to withstand the loads to be carried thereby, tend to develop stresses in their outer portions as they flex to pass around pulleys or rollers. Because their inner surfaces which contact the pulleys or rollers are substantially non-compressible, the belt pivots about the point of contact of the inner surface with the pulley as it flexes to pass around the pulley. Thence the outer surface must stretch by an amount which is dependent upon the thickness of the belt and the degree of curvature of the belt. This frequently results in cracking the outer surface or breaking the outer plies.

A further object of this invention is to provide a belt structure wherein this difficulty is avoided.

In one embodiment this is accomplished by laminating the belt from a plurality of superimposed fabric plies which are woven and treated to have different characteristics according to their particular positions in the belt. The plies are bonded into a unitary structure by a bonding resin having both flexibility and stretch, which bonds and protects the fabric without interfering with the compression and expansion of the outer layers thereof as the belt flexes in use. Certain synthetic resins hereinafter specified have been found to have the above characteristics and produce a conveyor belt which meets the requirements of certain mining operations where a strong, flexible, fireproof conveyor belt is essential.

More specifically the center ply or plies of the belt are composed of tightly woven fabric, reinforced if necessary by sheets of parallel yarns, which provide the required tensile strength. The outer plies are made stretchable and compressible by crimping the fabric and laminating the plies while the outer plies are held in unstressed condition so that they are capable of stretching or compacting as required to accommodate the flexing of the belt. The bonding coating in the outer plies may also be made cellular to facilitate the stretching or compression thereof with the outer plies.

The nature of the invention will be better understood from the following description, taken in connection with the accompanying drawings in which a specific embodiment has been set forth for purposes of illustration.

Figure 1:
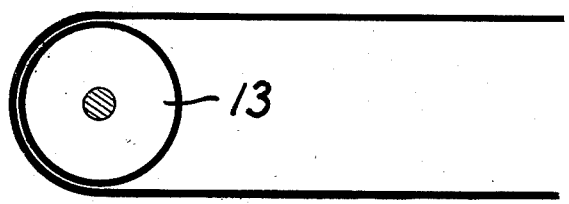
Fig. 1 is a side elevation of a belt embodying the invention.
Figure 2:
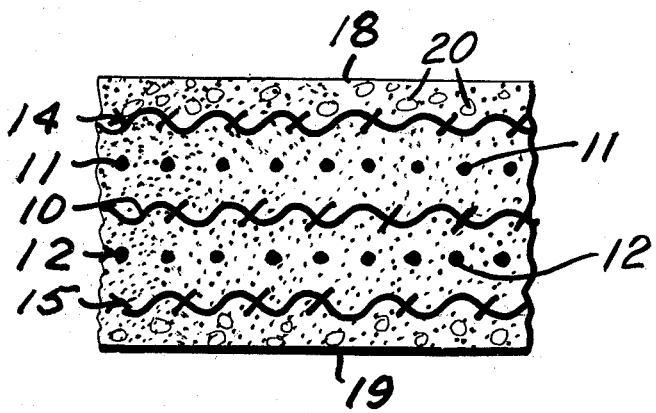
Fig. 2 is a transverse section taken on the line 2—2 of Fig. 1, but on a larger scale.
Figure 3:
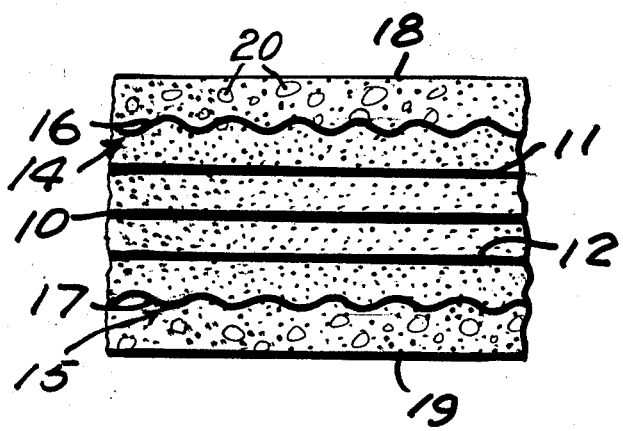
Fig. 3 is an expanded view of the belt illustrating the arrangement of the various plies.

Referring to the drawing more in detail the belt is shown as comprised of an inner ply 10 of woven fabric at least the warps of which are composed of a dimensionally stable yarn having a high tensile strength, such as prestretched, heat set, high tenacity tire cord nylon, rayon, Fortisan, or the like. Reinforcing sheets of parallel yarns 11 and 12 of similar material are shown as disposed respectively above and below the fabric layer 10.

The fabric layer 10 together with the yarns 11 and 12 constitute the load carrying element of the belt and forms the pitch line about which the belt pivots in flexing around a pulley 13.

Outer layers of woven fabric 14 and 15 are disposed on the outside of the yarns 11 and 12. These layers 14 and 15 may be more loosely woven than the layer 10 and are crimped or corrugated to form transverse folds 16 and 17 which increase the stretchability and the compressibility of the outer layers as the belt flexes about the pitch line of the center layer 10.

The layers 14 and 15 and the filler yarns of layers 10 may be composed of a flexible and absorbent material such as cotton and spun Dacron, Orlon, spun nylon, spun rayon, or the like.

The entire belt is impregnated with and embedded in a flexible bonding resin such as polyvinylchloride or the epoxy resins which are liquid or sols in plasticized form but polymerize to form resins when heated to polymerizing temperatures.

As an example the fabric layers 10, 14 and 15 and the yarns 11 and 12 may be thoroughly impregnated with liquid polyvinylchloride in a plasticizer such as tricresyl phosphate prior to assembly and pressed to impregnate the individual fibers. The fabric and yarn is then heated to a temperature of about 200° F. and immediately cooled. This dries and partially cures the resin to a somewhat soft and tacky state but sufficiently dry on the surface to permit the material to be easily handled or rolled. The layers 14 and 15 may be crimped while in this state as by passing between gear crimper rolls and will retain their crimped form.

The various layers are now plied and additional polyvinylchloride is applied between adjacent layers and around the yarns 14 and 15 and over the outer surfaces after which the assembly is heated to a temperature of 350° F. to 360° F. while confining the assembly to prevent loss of the liquid impregnant, but under a pressure which is insufficient to squeeze the liquid out of the mass.

At the above temperature the partially cured impregnant again becomes liquid and mixes with the added liquid polyvinyl chloride to form a homogeneous mass, which is immediately cooled to set the impregnant to solid plastic form. The layers are thus embedded in and bonded together by the cured resin which also forms layers 18 and 19 at the outer surfaces of the belt. The resin above described in flexible and stretchable to the extent necessary to flex with the belt and to stretch or contract with the outer fabric layers 14 and 15 when passing around the rollers.

The layer of resin in which the outer fabric layers 14 and 15 are embedded may be made porous if desired to improve its flexibility and in the interest of lightness by introducing hollow phenolic resin balls 20 filled with an inert gas.

Since the pitch line is located at the center of the belt the amount of stretch at the surface is about one-half of that required in standard belts where the pitch line is located at the point of surface control between the belt and the roller.

The polyvinyl chloride is thermoplastic and will again soften on heating but will not support combustion. Hence the belt meets fireproofing requirements.

The epoxy resins may be used in the same manner as the polyvinyl chloride above described to provide a belt having similar characteristics. The epoxy resins are thermosetting and after curing will not again soften upon reheating. They may be applied to the fabric and to the laminated structure together with a catalyst in the manner above described for the polyvinyl chloride. In this case the impregnated fabric is first partially cured so as to leave the epoxy resin in a tacky state so that it readily bonds to the additional liquid material which is applied during lamination and is set by the final heat curing. The product has characteristics similar to those described above.

What is claimed is:

A conveyor belt comprising a central layer of flat fabric having warpwise strands extending longitudinally and having a high dimensional stability and outer layers of fabric disposed on each side of said central layer, said outer fabric layers having transverse crimps forming surface folds which permit longitudinal expansion and contraction of said outer fabric layers in use, said layers being bonded together by a resin selected from the group consisting of polyvinyl chloride and epoxy resins in a cured state, said resin impregnating said fabric, forming a continuous resin layer between said fabric layers and forming a continuous coating of resin over the outer surfaces of said outer fabric layers, said resin being in a state to stretch and compress with said outer fabric layers as the belt flexes about said center fabric layer as a pitch line.

References Cited in the file of this patent
UNITED STATES PATENTS

| | | |
|---|---|---|
| 2,010,894 | Repony et al. | Aug. 13, 1935 |
| 2,526,324 | Bloomfield | Oct. 17, 1950 |
| 2,727,844 | Adams | Dec. 20, 1955 |
| 2,732,002 | Gardner | Jan. 24, 1956 |
| 2,793,151 | Arnett | May 21, 1957 |
| 2,806,509 | Bozzacco et al. | Sept. 17, 1957 |

FOREIGN PATENTS

| | | |
|---|---|---|
| 1,109,687 | France | Sept. 28, 1955 |